(12) United States Patent
Narayan et al.

(10) Patent No.: US 11,108,710 B2
(45) Date of Patent: Aug. 31, 2021

(54) COMPUTERIZED SYSTEM AND METHOD FOR MULTI-FACTOR MESSAGE CLASSIFICATION AND DELIVERY

(71) Applicant: VERIZON MEDIA INC., New York, NY (US)

(72) Inventors: Neeti Narayan, Sunnyvale, CA (US); Hongwei Shang, Sunnyvale, CA (US); Changsung Kang, San Jose, CA (US); Jean-Marc Langlois, Menlo Park, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/774,044

(22) Filed: Jan. 28, 2020

(65) Prior Publication Data

US 2021/0234813 A1    Jul. 29, 2021

(51) Int. Cl.

| | |
|---|---|
| *G06F 15/16* | (2006.01) |
| *H04L 12/58* | (2006.01) |
| *G06N 3/08* | (2006.01) |
| *G06F 40/30* | (2020.01) |
| *G06N 3/04* | (2006.01) |
| *G06F 40/205* | (2020.01) |

(52) U.S. Cl.
CPC ............ *H04L 51/02* (2013.01); *G06F 40/205* (2020.01); *G06F 40/30* (2020.01); *G06N 3/04* (2013.01); *G06N 3/08* (2013.01); *H04L 51/22* (2013.01); *H04L 51/24* (2013.01)

(58) Field of Classification Search
CPC .... G06Q 10/10; G06Q 10/107; G06Q 30/016; G06F 16/35; G06F 16/335; G06F 16/24564; G06F 16/245; H04L 51/12; H04L 51/046; H04L 67/22; H04L 51/02; G06N 20/00; G06N 3/0445; G16H 40/20; G06K 9/6256

See application file for complete search history.

(56) References Cited

U.S. PATENT DOCUMENTS

| | | | |
|---|---|---|---|
| 10,412,185 B2* | 9/2019 | Lu | ........................... H04L 67/22 |
| 2009/0006285 A1* | 1/2009 | Meek | ..................... G06Q 10/10 |
| | | | 706/12 |
| 2009/0228560 A1* | 9/2009 | Sholtis | ................. G06Q 10/107 |
| | | | 709/206 |
| 2013/0073982 A1* | 3/2013 | Abouyounes | ........ G06Q 10/107 |
| | | | 715/752 |

(Continued)

*Primary Examiner* — Dustin Nguyen
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel messaging framework that automatically applies a multi-factor analysis technique to incoming and received messages in order to properly identify a message's type and category, which dictates the manner in which the message is displayed within a recipient's inbox. The disclosed framework operates on two levels: i) it determines whether a message is from a human or machine sender (H/M classification), and ii) it determines the messages category (MAGMA categorization).

17 Claims, 12 Drawing Sheets

(56) References Cited

U.S. PATENT DOCUMENTS

| | | | |
|---|---|---|---|
| 2013/0086180 A1* | 4/2013 | Midgen | G06Q 10/107 |
| | | | 709/206 |
| 2015/0195224 A1* | 7/2015 | Karnin | H04L 51/046 |
| | | | 706/12 |
| 2016/0196561 A1* | 7/2016 | Iyer | G06Q 30/016 |
| | | | 705/304 |
| 2016/0307110 A1* | 10/2016 | Catanzano | G06F 16/35 |
| 2017/0243134 A1* | 8/2017 | Housman | G06F 16/245 |
| 2018/0145934 A1* | 5/2018 | Pappu | H04L 51/02 |
| 2018/0159808 A1* | 6/2018 | Pal | H04L 51/12 |
| 2018/0337878 A1* | 11/2018 | Sathi | G06N 20/00 |
| 2019/0079999 A1* | 3/2019 | Min | G06F 16/335 |
| 2019/0108486 A1* | 4/2019 | Jain | G06N 3/0445 |
| 2019/0124024 A1* | 4/2019 | Oberg | G16H 40/20 |
| 2020/0401613 A1* | 12/2020 | Rogynskyy | G06F 16/24564 |
| 2020/0410303 A1* | 12/2020 | Swint | G06K 9/6256 |

\* cited by examiner

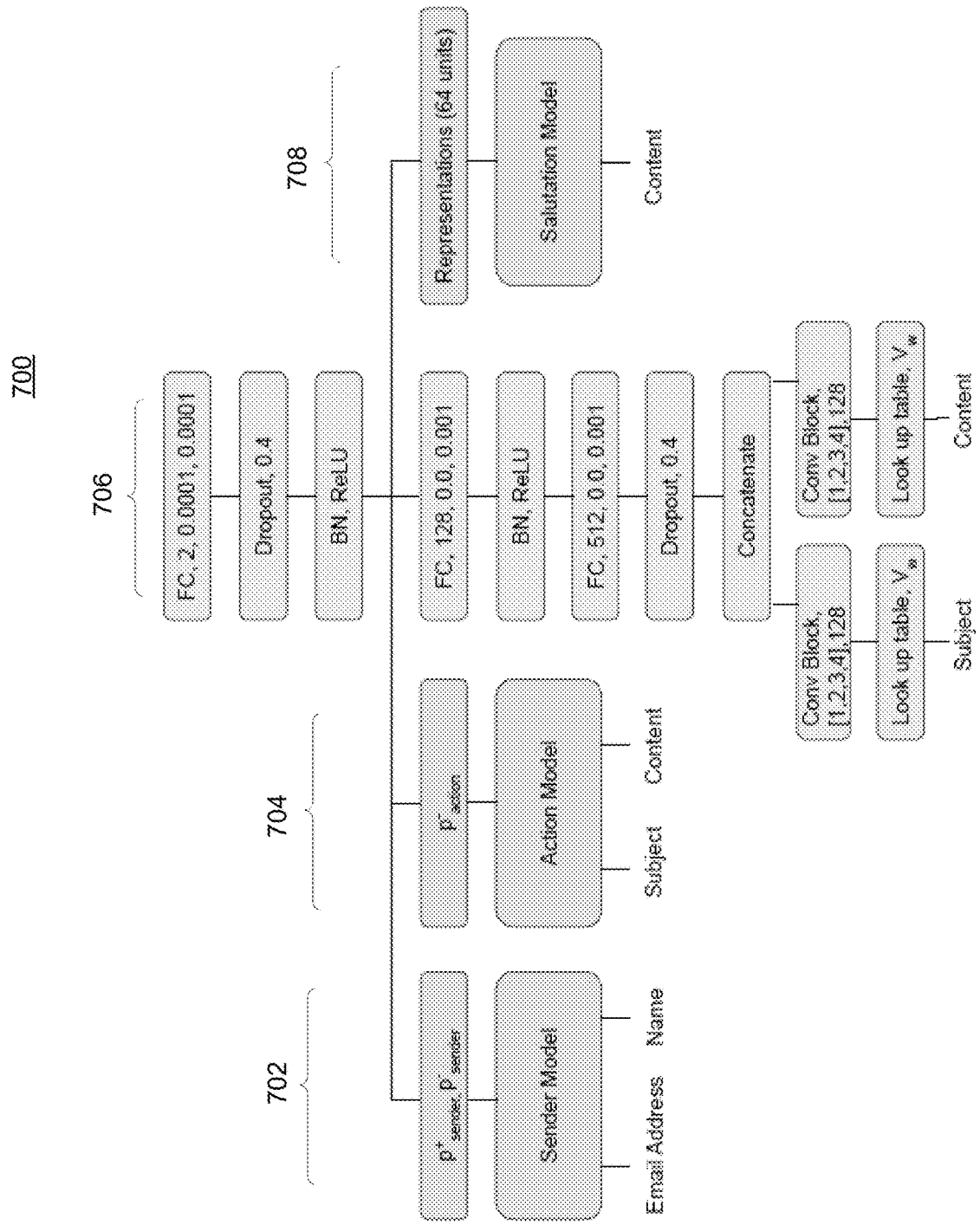

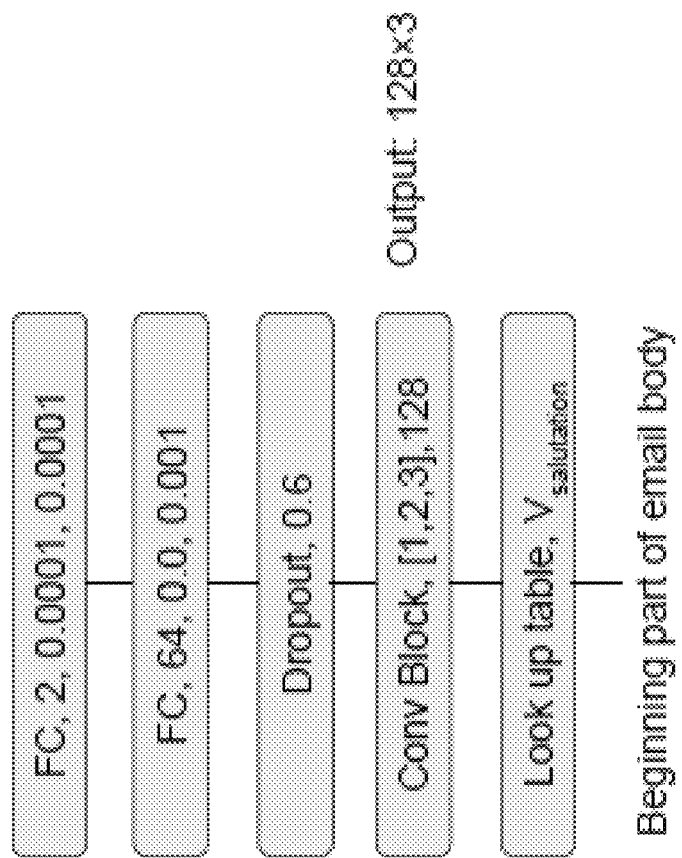

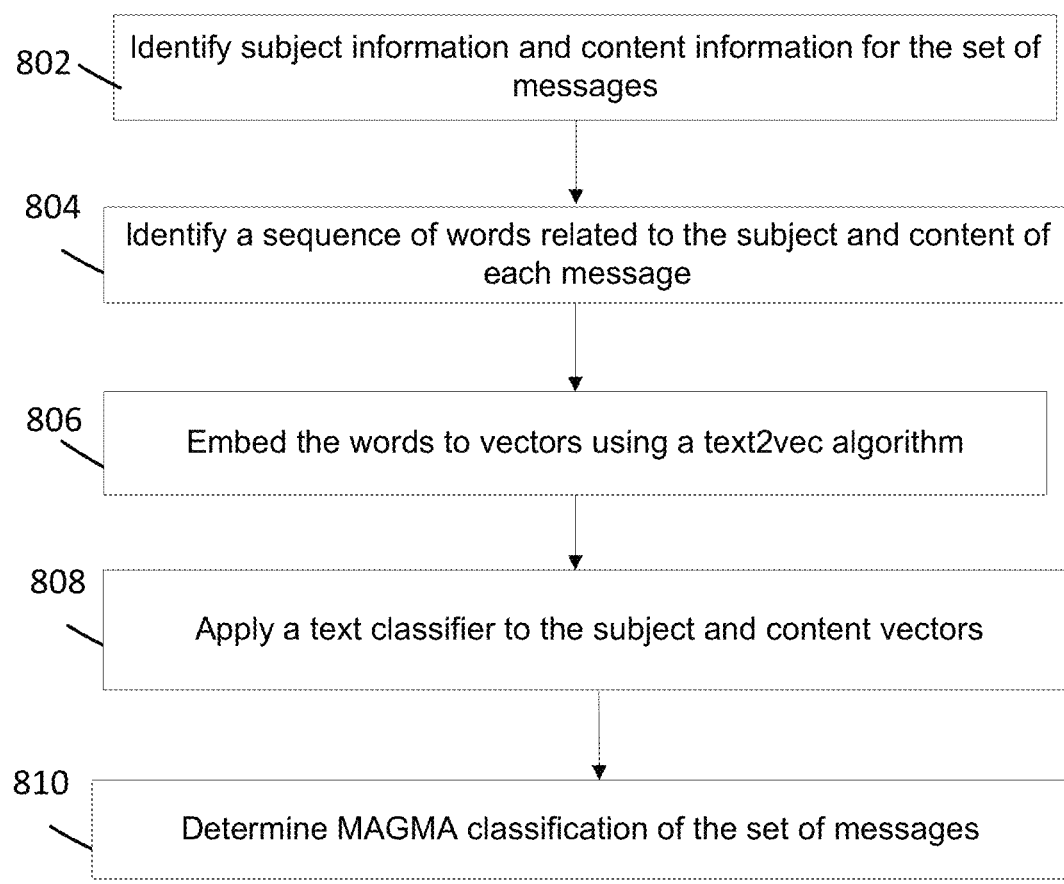

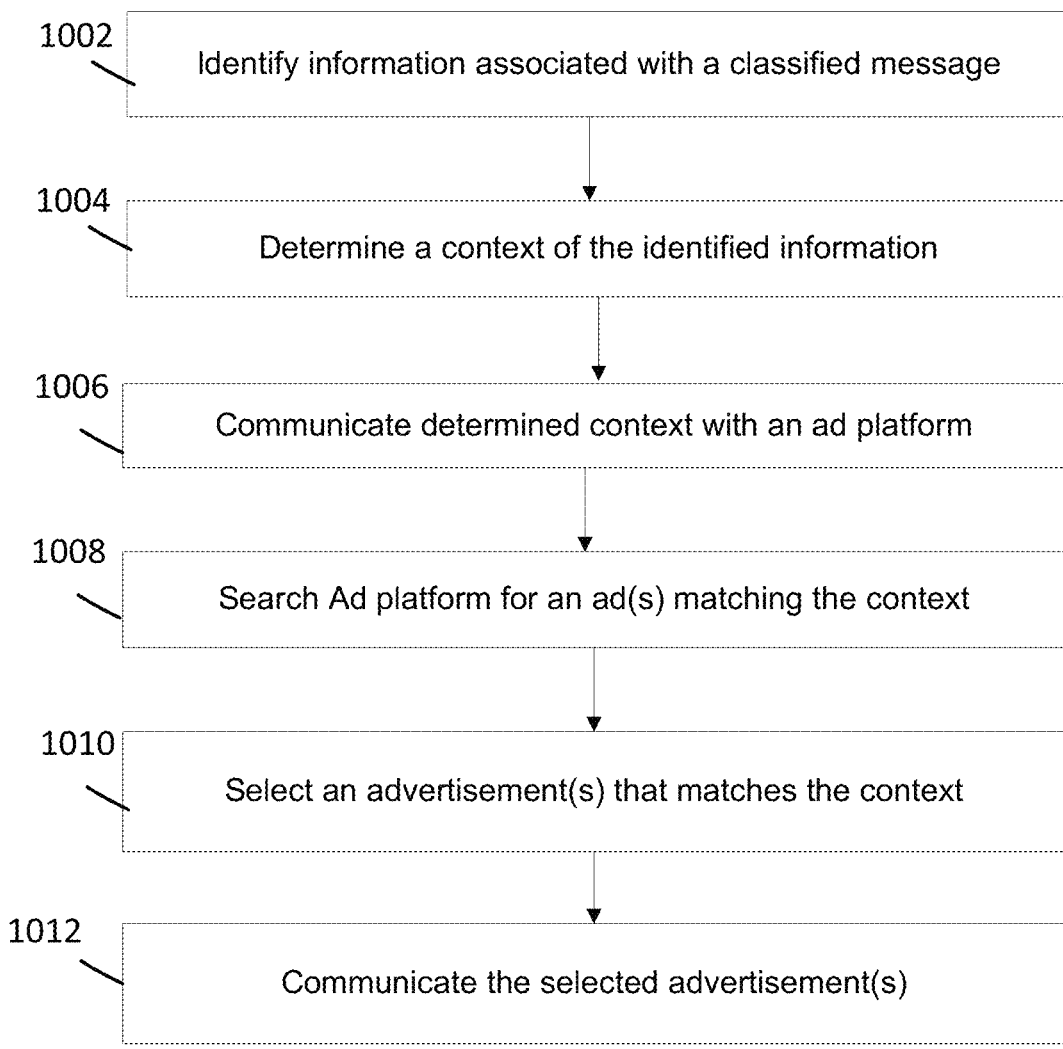

COMPUTERIZED SYSTEM AND METHOD FOR MULTI-FACTOR MESSAGE CLASSIFICATION AND DELIVERY

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of network based computerized content hosting and providing devices, systems and/or platforms by modifying the capabilities and providing non-native functionality to such devices, systems and/or platforms through a novel and improved messaging framework for automatically classifying and displaying messages within an inbox based on a multi-factor analysis technique that properly identifies a message's type and category which influences the manner in which it is displayed within a recipient's inbox.

BACKGROUND

Electronic mail ("email") remains the central form for online communication, task coordination and information storage. About 281 billion emails are sent and received daily even with the rise of social networks and instant messaging, and with each passing year, the number of emails is predicted to increase.

Machine generated messages, such as a mass marketing email and/or a templated email, commonly originating from scripts by commercial entities cover 90% of today's non-spam Web Mail traffic. Such entities include social networks, e-commerce sites, travel operators, and the like.

For several years now, email classification has remained a challenging task because of factors such as volume, latency and privacy. Most current attempts at automating and learning mail classifications involve discerning between human senders (for human generated emails) and machine senders (for machine generated messages), and at the receiving end, using pre-defined folders which requires users to classify mail to meaningful folders, thus making the data very sparse.

For example, conventional classifiers distinguish between human and machine generated messages via a classifier based on as simple logistic regression model. The model was trained by aggregating content and behavioral features at SMTP address (sender) level, with 2 million features per sender. It relies on a large number of well-designed features for prediction, including content, sender, behavioral and temporal behavioral features. In spite of its accurate prediction, this model has a "sender cold start" issue. The model may not be able to conduct appropriate learning for new senders with few associated messages, especially when the model's most predictive features are historical behavioral features and new users do not have enough history to provide reliable features.

Another drawback of such logistic regression model is that it is "simple", in that it does not utilize recent developments in natural language processing (NLP). In addition to considering a behavior features, the current models use only bag-of-words as content input without taking into account signals from text sequences like long short-term memory (LS™) and CNN models.

Recent methods to discover latent categories from folder data by applying a classification method and Latent Dirichlet Allocation (LDA) have been proposed. However, the inferred categories demonstrated an unclear mix of levels of abstraction. This leads to inaccurate results, along with a lag time that wastes system resources.

Thus, the conventional mechanisms for classifying messages within messaging systems and platforms are falling short by in the ways messages can be analyzed and processed, in addition to when they can be analyzed and processed during transmission.

SUMMARY

The disclosed systems and methods address these shortcomings and provide a novel messaging framework that automatically applies a multi-factor analysis technique to incoming and received messages in order to properly identify a message's type and category, which dictates the manner in which the message is displayed within a recipient's inbox. The disclosed framework operates on two levels: i) it determines whether a message is from a human or machine sender, and ii) it determines the messages category, as discussed below.

According to some embodiments, the disclosed framework employs deep learning models at the message level rather than aggregating features at sender level. This focuses the computations to the features of the messages, rather than the 2 million features per sender. This leads to a more computationally efficient mechanism for analyzing and processing messages, and is more accurate as the message's characteristics/features provide the indicator of its type/category.

As discussed in more detail below, four individual convolutional neural networks (CNNs) are built and trained: 1) a content model with subject and content as input; 2) a sender model with sender email address and name as input; 3) an action model by analyzing email recipients' action patterns on human/machine messages and correspondingly generated target labels based on senders' opening/deleting behaviors; and 4) a salutation model which takes advantage of senders' explicit salutation signals as positive labels.

These four models are combined into a final full model based on options for combining them: a) at raw feature level; b) at representation level; c) at final output level; and d) at final output level with rectification. As discussed below, option b) is better than option a) due to the over-fitting issue by sender email address feature; and option d) is better than option c) for cases without confident prediction. Experimental results on editorial data shows that by fixing precision at 94.8%, the full model achieves adjusted recall 85.48%, compared against 70.54% for the conventional production model discussed in the "Background" section above.

The disclosed framework keeps a simple neural network model structure, and builds its own vocabulary dictionary based on word frequency and chi-square statistics. With a comparable number of words as learning algorithm GloVe, models built without this proprietary dictionary can achieve the same prediction accuracy with embedding dimension 64, in contrast to using GloVe's pre-trained word embedding with dimension 300. This reduces the model size by almost 4 times smaller than using a pre-trained embedding such as GloVe.

According to some embodiments, as discussed in more detail below, the disclosed framework moves from regular binary classification to a multi-class (or multi-label) one via applied deep learning in NLP. It is applicable to various email domains and is not dependent on manually engineered features.

Emails analyzed via the disclosed framework can be categorized further into 7 broad and objective MAGMA (Machine Generated Mail Analysis) classes: i) Human (personal); ii) Social; iii) Travel; iv) Career; v) Shopping; vi) Finance; and vii) Other. Such classification formulates the task as a multi-label problem and uses email subject and content, and incorporates a deep model into the classification pipeline. This, therefore, goes beyond simply using a bag-of-words model and sparse user behavior features. It also prevents users from becoming overwhelmed with inbox management and hence, improves user engagement.

Thus, the disclosed systems and methods can determine whether a message is human-generated or machine-generated; and can also classify that message into 7 broad and objective MAGMA (Machine Generated Mail Analysis) classes: i) Human (personal); ii) Social; iii) Travel; iv) Career; v) Shopping; vi) Finance; and vii) Other. The result is that the recipient's inbox is organized and displays messages based on such classifications.

As discussed herein, reference to "messages" can be any type of message, content card or asset that is receivable within any known or to be known messaging or email system. For purposes of this disclosure, reference will be made to electronic mail (email); however, it should not be construed as limiting, as any form of messages, cards or assets can be utilized without departing from the scope of the instant disclosure. The message content comprised within such messages, cards or assets can be any type of digital content, such as, but not limited to, text, audio, video, graphics interchange format (GIF) files, digital advertisements, uniform resource locators (URLs), and/or any other type of known or to be known multimedia or network resource, or some combination thereof.

In accordance with one or more embodiments, the instant disclosure provides computerized methods for a novel framework for automatically classifying and displaying messages within an inbox based on a multi-factor analysis technique that properly identifies a message's type and category. In accordance with one or more embodiments, the instant disclosure provides a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, ad server, content server and/or client device, and the like) cause at least one processor to perform a method for a novel and improved framework for automatically classifying and displaying messages within an inbox based on a multi-factor analysis technique that properly identifies a message's type and category.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 7A-7C are schematic diagrams illustrating non-limiting examples of components for classifying a message in accordance with some embodiments of the present disclosure;

FIG. 8 is a block diagram illustrating an exemplary data flow in accordance with some embodiments of the present disclosure;

FIG. 10 is a block diagram illustrating an exemplary data flow in accordance with some embodiments of the present disclosure.

DESCRIPTION OF EMBODIMENTS

Figure 1:
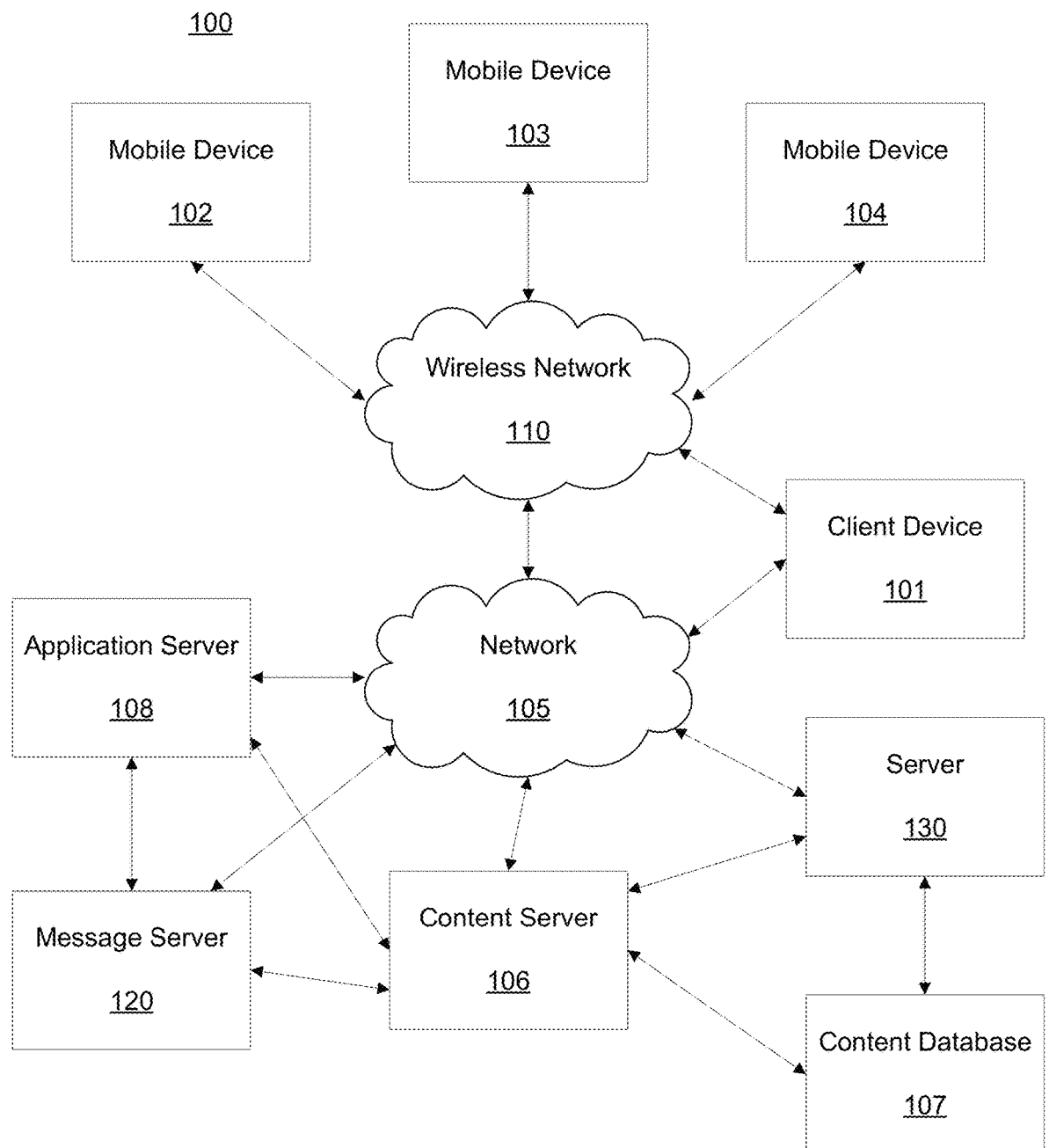
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

As discussed in more detail below at least in relation to FIG. 10, according to some embodiments, information associated with, derived from, or otherwise identified from, during or as a result of the message classification/categorization and display within an inbox, as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")–network 105, wireless network 110, mobile devices (client devices) 102-104 and client device 101. FIG. 1 additionally includes a variety of servers, such as content server 106, application (or "App") server 108, message server 120 and third party server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

Third party server 130 can comprise a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, and the like) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), instant messaging application, blog, photo or social networking application (e.g., Facebook®, Twitter® and the like), search application (e.g., Yahoo!® Search), and the like, can be hosted by the application server 108, message server 120, or content server 106 and the like.

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108 and/or 130 may be integrated into a single computing device, without departing from the scope of the present disclosure.

Figure 2:
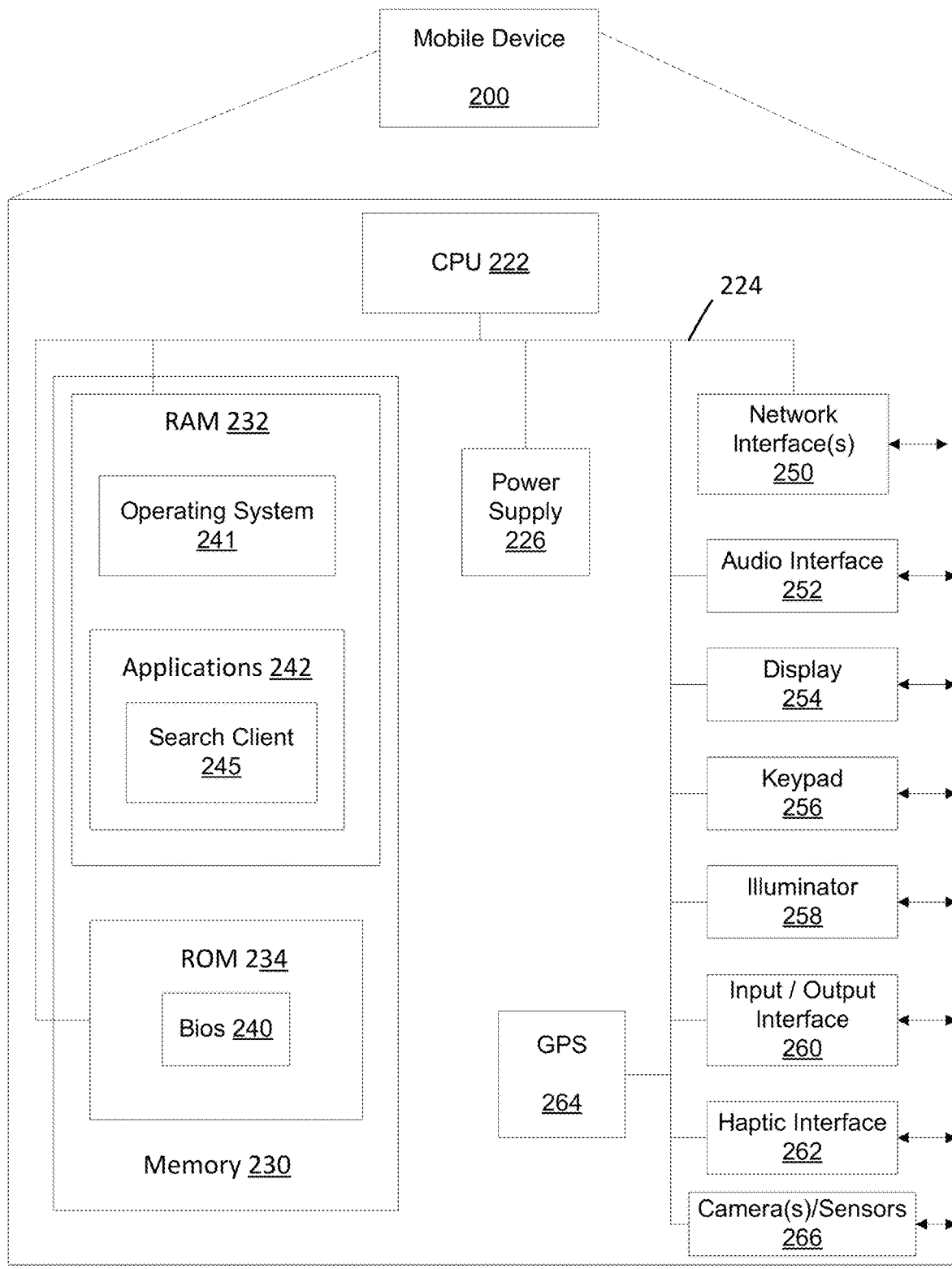
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including, for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below.

Figure 3:
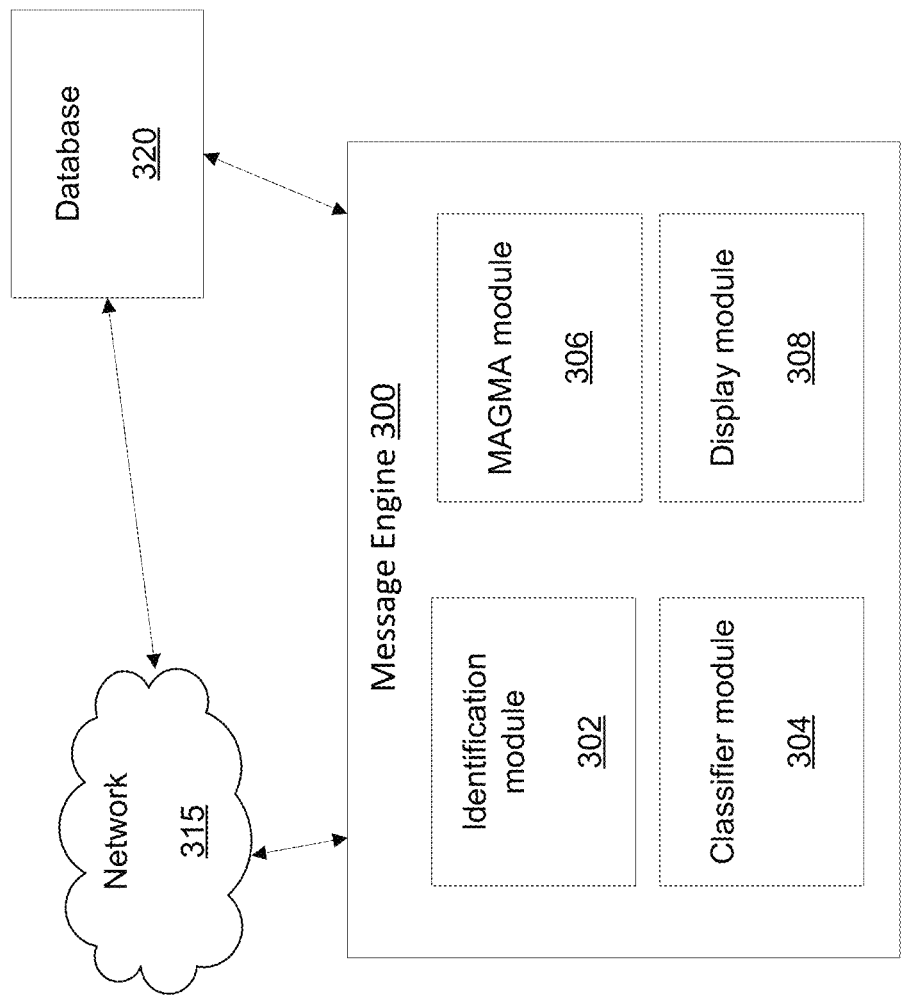
FIG. 3 is a block diagram illustrating components of an exemplary system in accordance with embodiments of the present disclosure.

FIG. 3 is a block diagram illustrating the components for performing the systems and methods discussed herein. FIG. 3 includes message engine 300, network 315 and database 320. The message engine 300 can be a special purpose machine or processor and could be hosted by a messaging server, application server, content server, social networking server, web server, search server, content provider, third party server, user's computing device, and the like, or any combination thereof.

According to some embodiments, message engine 300 can be embodied as a stand-alone application that executes on a user device. In some embodiments, the message engine 300 can function as an application installed on the user's device, and in some embodiments, such application can be a web-based application accessed by the user device over a network. In some embodiments, the message engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, type of message (human generated or machine generated), content type, class or category, information associated with the sender or recipient(s) of a message, information associated with content included in a message, and any other type of known or to be known attribute or feature associated with a message or content of a message, or some combination thereof.

According to some embodiments, information related to, derived from or otherwise determined from analysis of messages addressed to and/or hosted within a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages or other forms of electronic messages), other forms of messages (e.g., social media messages, Instant Messages (IMs)) and/or content items (e.g., assets or cards), and other mediums that display digital content information in whole or in part (e.g., a map), and the content included therein, including, text, audio, images, multimedia, RSS feed information, can be used without departing from the scope of the instant application, which can thereby be communicated and/or accessed and processed by the message engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the message engine 300, and the database of stored resources 320. Indeed, as illustrated in FIG. 3, the message engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as message engine 300, and includes identification module 302, classifier module 304, MAGMA module 306 and display module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
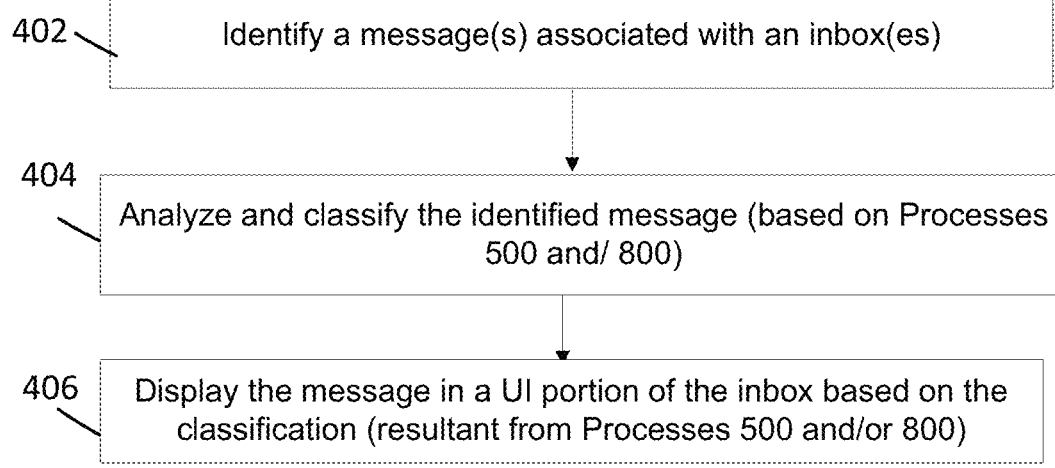
FIG. 4 is a block diagram illustrating an exemplary data flow in accordance with some embodiments of the present disclosure.

Turning to FIG. 4, Process 400 provides a non-limiting data flow detailing how a message is classified and delivered. Specific embodiments of the analysis and classifications performed within Process 400 are detailed as part of Processes 500 and 800, as discussed below in connection with the classification step (Step 404).

According to some embodiments of Process 400 of FIG. 4, Step 402 of Process 400 is performed by the identification module 302 of message engine 300; Step 404 is performed by the classifier module 304 and/or the MAGMA module 306; and Step 406 is performed by the display module 308.

Process 400 of FIG. 4 begins with the identification of a set of messages to be analyzed. Step 402. In some embodiments, the set of messages can be those associated with a user's inbox, and in some embodiments, the set of messages can be those associated with an aggregate of user inboxes—e.g., inboxes of users associated with an email domain, message platform, messaging service and the like. In some embodiments, the set of messages can be across domains or messaging platforms. In some embodiments, the set of the messages can be messages sent/received within a predetermined time period, messages associated with a geographic location, messages of a particular type, messages that include a type of content or message context, messages that have been opened, saved, deleted, responded to or forwarded to other users, or any other type of activity performed on sent/received messages (e.g., tagged or otherwise categorized within a user's inbox), and the like, or some combination thereof.

In some embodiments, the identified set of messages can be incoming messages addressed to the inbox(es). In some embodiments, the messages can be those that are already delivered within the inbox(s). For purposes of this discussion, the messages will be treated as incoming messages; however, it should not be viewed as limiting, as one of ordinary skill in the art would understand that the scope of the analysis discussed below would not change based on where the message are within the delivery pipeline.

In Step 404, the identified set of messages are analyzed and classified. As discussed in more detail below, embodiments of the analysis and classification steps are detailed in relation to Process 500 of FIG. 5 and/or Process 800 of FIG. 8. In some embodiments, the set of messages are subject to both classifications occurring in FIGS. 5 and 8 (in either order or at the same time as parallel processes), and in some embodiments, the messages are only subject to one of them.

As discussed in more detail below, the set of messages identified in Step 402 are analyzed and the message data included in those messages can be collected, extracted, retrieved or otherwise identified. According to some embodiments, the analysis involves parsing each message's data and metadata and identifying the data included in the header, subject line and/or message body. Upon identifying the data, it can then be extracted (and in some embodiments, stored in database 320).

The message data identified from the analysis that is collected can include, but is not limited to and does not necessarily have to include, a name (or identifier), type and address of the sender and/or recipient(s), phone number, IP address, location (that is referenced in the message, of the sender/recipient), context, type and category of the content in the message, tags or other identifiers or classifiers applied to or embedded within the message, characteristics/features of the content (e.g., items in the subject line and message body, attributes or definitions of the content, and body character length and number of URLs occurring in the body), types of messages (e.g., user generated or machine generated from a template), attributes/features from the address of the sender/recipient (e.g., which domain, subdomain and/or sub-name, and the like), behavioral features indicative of the actions taken on and/or to generate the messages (e.g., the sender's outgoing activity such as weekly and monthly volumes of sent messages, histogram of the number of recipients in their messages, which action was performed on the message, if any, when it was received by a recipient, and the like), temporal behavioral features associated with the message (e.g., a frequency of specific actions over a period of time—for example, whether a sender sends more than x messages in an hour), and the like, and/or some combination thereof.

According to some embodiments, Step 404's analysis can also involve identifying information about the sender/recipient of each message or content included in each message, and using this data to retrieve additional or supplemental information from other online sources such as, but not limited to, online directories, social networking websites, web pages, results pages found by search engines, and the like. Thus, additional information related to the messages can be identified and utilized as part of the classification, as discussed below.

Figure 5:
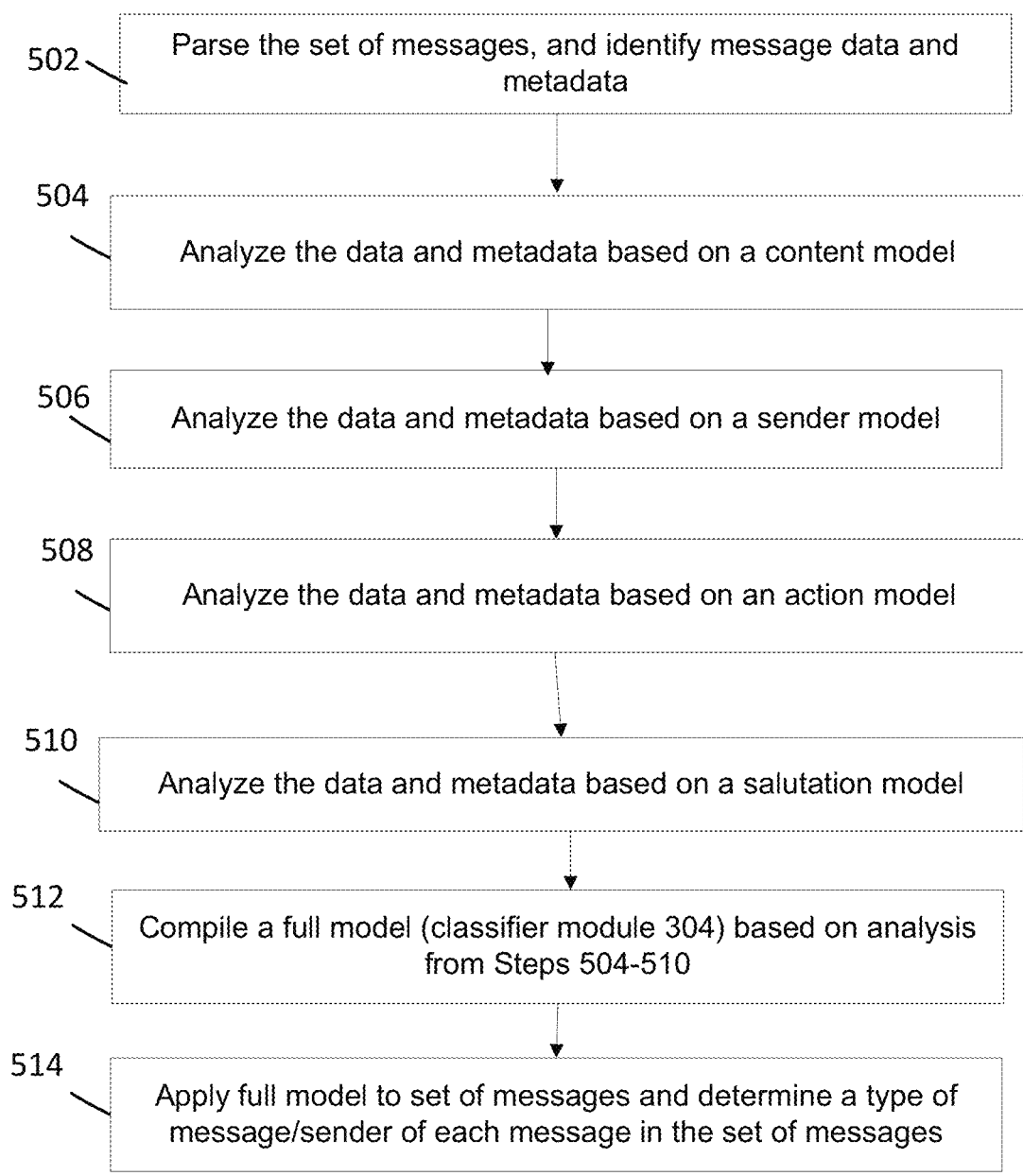
FIG. 5 is a block diagram illustrating an exemplary data flow in accordance with some embodiments of the present disclosure.

Turning to FIG. 5, Process 500 details an embodiment for performing the analysis and classification of Step 404 of FIG. 4. The steps of Process 500 are performed by classifier module 304 of engine 300.

Process 500 provides mechanisms for engine 300 to identify and classify messages into human and machine categories by solely relying on the message itself as input without any additional feature engineering. As discussed below, to further improve prediction accuracy, useful user behavior signals are utilized as target labels rather than input: separate training data sets are created by generating target labels from these signals, and individual sub-models are built by keeping the same input for each set of created training data. Finally, the full model combines and applies these sub-models for final prediction. By directly building the full model at message level, engine 300 can determine whether a message was machine generated or human generated without any behavioral information as input.

The disclosed steps of Process 500 evidence a message classification model that that (1) builds CNN models based on generated target labels from users' behavior signals (e.g., senders' explicit salutation at the beginning of message, and recipients' opening/deleting behaviors); and (2) determines combinations of sub-models for final compilation and application of the final full model.

Process 500 begins with Step 502 where the messages identified in Step 402 of FIG. 4 are analyzed. Step 502 involves parsing the message and identifying the data and metadata of each message. Such analysis is discussed above in relation to Step 404.

In Steps 504-510, individual CNN models are applied to the data/metadata of messages in order to analyze specific/different features of the messages. The models (also referred to as "sub-models") include a content model, sender model, action model and salutation model. Thus, as discussed herein, Step 504 involves applying a content model to the data/metadata of the identified set of messages; Step 506 involves applying a sender model to the data/metadata of the identified set of messages; Step 508 involves applying an action model to the data/metadata of the identified set of messages; and Step 510 involves applying a salutation model to the data/metadata of the identified set of messages.

For each of the sub-models, the main component is the temporal convolutional module, which simply computes a 1-D convolution using temporal convolution, batch normalization, and max-pooling to deal with the temporal textual data. The final full model (as discussed below in relation to Steps 512-514) combines the four CNN models by joining each model's individual representations at different levels.

Figure 6:
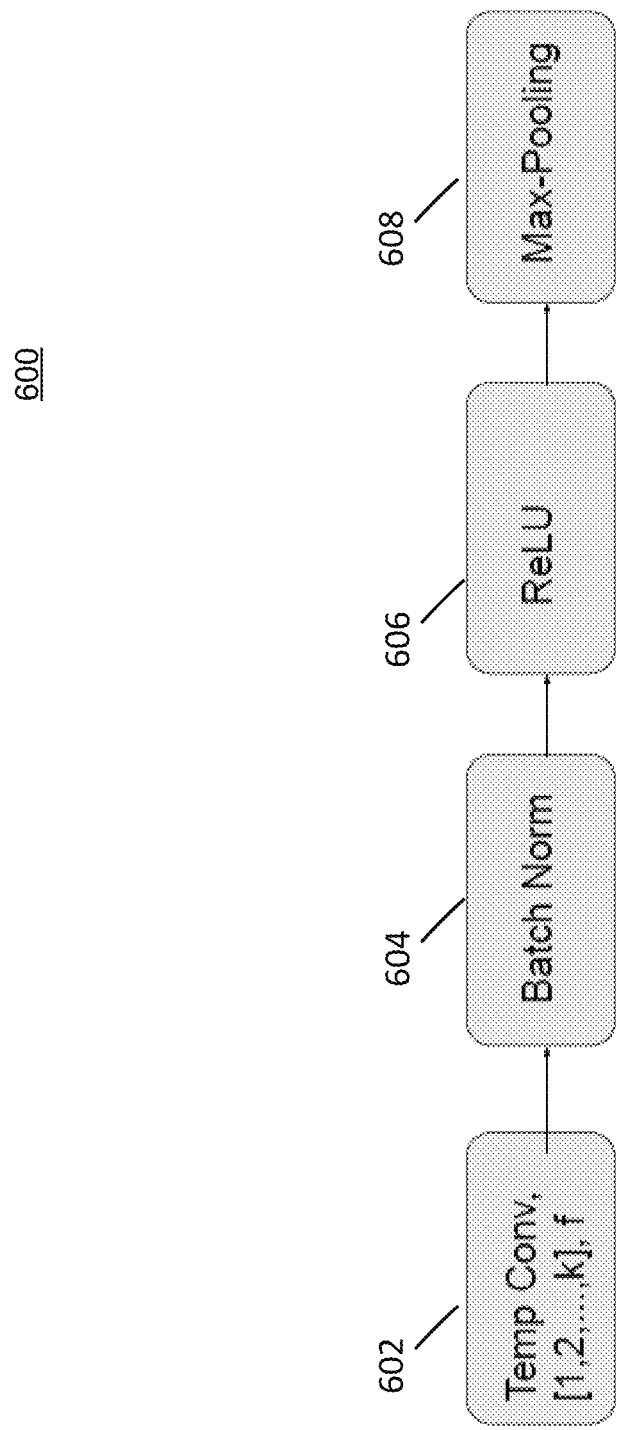
FIG. 6 is a schematic diagram illustrating a non-limiting example of components for classifying a message in accordance with some embodiments of the present disclosure.

For the ease of the notation, turning to FIG. 6, a convolutional block 600 is depicted. A convolutional block 600 consists of a sequence of: one convolutional layer 602, a batch normalization layer 604, a ReLU activation function 606, and a max-pooling layer 608. In the discussion below, block 600 is denoted by Conv Block,[1,2, ..., k],f, with the number of filters f for each sliding window size in [1,2, ..., k].

The temporal convolutional module consists of a set of filters with various sliding window sizes. Each filter applies a convolution operation on its input, with its weights are learnt during the training. By running a contextual sliding window over the input word/letter-trigram sequence, each filter can learn its pattern. For purposes of this disclosure, a stride of 1 is utilized.

Convolutional layer 602 is represented by "Temp Block, [1,2, ..., k],f", where [1,2, ..., k] represents all sliding window sizes applied for convolution operations and f corresponds to the number of filters for each sliding window size in [1,2, ..., k]. Max pooling 608 is used to force only the most useful local features produced by the convolutional layers; the maximum value across each sliding window over the whole sequence is selected for each filter. Batch normalization 604 is also used to normalize its input, which brings an additional regularization effect and as a result, accelerates the training.

In addition to "Conv Block,[1,2, ..., k],f", fully connected layers can be denoted with no activation function by "FC, o, l1, l2" where o is the number of output neurons and l1, l2 represents the penalty parameters for L-1 and L-2 regularization respectively. For simplicity, "BN, ReLU" can be used to denote a batch normalization layer 604 followed by a ReLU activation function 606.

In each of the models, the sequence length is fixed at s, with subscripts used to denote each specific feature. For example, $s_{subject}$ represents the sequence length for the subject input. When the sequence length is smaller than s, the remaining positions are fully padded with index 0. When the sequence length is larger than s, the words appearing after the $s^{th}$ position of the sequence can be ignored.

Each sub-model considers a word-unigram/letter-trigram dictionary (look-up table), and creates a vectoral representation (embedding) for each word or letter-trigram, depending on the specific model. V is used with subscripts to denote a dictionary for different features, with $V_w$, $V_{trig}$, $V_{name}$ corresponding to word dictionary for subject and content, letter-trigram dictionary for sender email address, and word dictionary for sender name respectively.

Thus, Steps 504, 506, 508 and 510 involve applying a model-specific dictionary, then creating a model-specific vectoral representation for each word/letter-trigram.

The content model, utilized in Step 504, uses email subject and content as inputs to predict 1(human) vs 0(machine), with the model structure shown in FIG. 7A, item 706. In this example base model, the inputs are a fixed-size padded subject with sequence length $s_{subject}$ and a fixed-size padded content with sequence length $s_{content}$. This content model starts with a look-up table that creates a vectoral representation for each word and converts both subject and content inputs into tensors with size $s_{subject} \times e$ and $s_{content} \times e$ separately, where e is embedding dimension size.

According to some embodiments, two separate convolutional blocks "Conv Block,[1,2, ..., k],f" are applied, with k=4 and f=128 for both subject and content inputs, resulting in a one-dimensional tensor with length k=4 and f=512 for both subject and content inputs. These two tensors are concatenated into a single vector with length 1024, which then goes through a dropout layer with dropout rate r=0:4. The resulting vector can be the input to two fully connected layers, with each fully connected layer followed by a batch normalization and ReLU activation function. After using one more dropout with the same dropout rate, a final layer with two hidden units is implemented before applying softmax function to calculate estimated probability score.

Figure 7B:
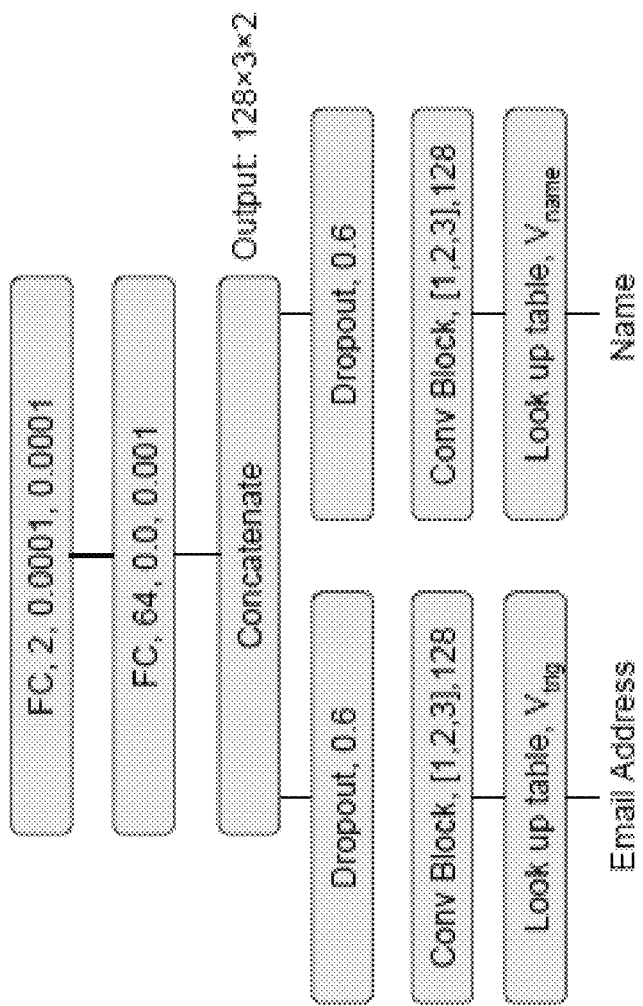

The sender model, utilized in Step 506, uses a sender's email address and name as inputs to predict 1(human) vs 0(machine), with the model structure shown in FIGS. 7A-7B, item 702. The sender model contains (1) a letter-trigram representation layer obtained by running a contextual sliding window over the input sequence on sender email address followed by creating vectoral representation for each letter-trigram through $V_{trig}$; (2) in parallel with the above step, a word-unigram representation layer is obtained by creating vectoral representation for each word in sender name through $V_{name}$; (3) a convolutional block Conv Block, [1,2,3],128 and a followed dropout layer with dropout rate 0.6 for both resulting representations obtained from sender email address and name input; (4) a concatenation layer that concatenates the resulting sender email features and name features obtained from the previous step; (5) a fully connected layer with 64 output neurons and L2-norm penalty with penalty parameter 0.001; (6) a final fully connected layer that outputs 2 units, containing both L1-norm and L2-norm with the same penalty parameter 0.0001.

Turning to the action model, utilized in Step 508 and depicted in FIG. 7A as item 704, a relationship between whether an email is machine generated or not, and the action that is taken is evaluated. For purposes of this discussion, the actions of "opening" and "deleting" will be considered; however, it should not be construed as limiting as any type of action performed on a message can be taken into account as a factor for the action model.

For example, the table below illustrates the percentages of messages for human, machine and unknown sender categories under different recipient actions.

|  | random | open, not deleted (A) | not open, deleted (B) | A/B |
|---|---|---|---|---|
| Human | 5.10% | 26.94% | 1.74% | 75.23% |
| Machine | 67.02% | 49.31% | 76.19% | 2.93% |
| Unknown | 27.88% | 23.75% | 22.07% | 21.84% |

With random sampling from an email pool (e.g., messages for the Yahoo! Mail® domain), 5.10% of sampled messages belong to human category. Restricting the sampling based on deleted and not opened messages (denoted by B) will produce only 1.74% human category messages. Restricting the sampling from messages that are opened and not deleted by recipients (denoted by A) will produce 26.94% human category messages.

A higher percentage, 75.23%, of human category messages can be obtained by further filtering set A (denoted by AB): removing messages whose corresponding senders appear in B from A. Note that the above statistics are calculated by taking into account more than 20% messages in unknown category. Ignoring the unknown messages for action A will yield to 96.25% of human messages.

Based on the above correlations between a message's sender category and the recipients' action on messages, a set of training data can be generated with i) messages that are "deleted and not opened" (B) as negative label 0; and ii) messages that are "open and not deleted" with removing senders appearing in B and corresponding messages (A) as positive label 1.

With this generated message-level training data, the CNN action model can be trained and can implement the same model structure as the content model 706, as discussed above (the action model has the same structure as content model, item 706 in FIG. 7A). For example, according to some embodiments, the subject and content information can be the input of the action model 704 (Step 508).

Turning to the salutation model, illustrated in FIGS. 7A and 7C as item 708, the analysis utilized in Step 510 is motivated by analyzing false negative messages produced by the previous production model. That is, under conventional techniques, messages with an explicit salutation (e.g. starting with "Dear . . . ") tend to be sent by someone who knows the person, thus belonging to human messages. Here, a message is defined to contain "explicit salutation" if there is a match between the recipient names and the beginning part of the email body.

Considering this relationship, another set of training data can be generated with i) messages that contain an explicit salutation as positive label 1; and ii) messages that do not contain explicit salutation as negative label 0.

With the generated message-level training data, the CNN salutation model can be trained using the beginning part of email body as input, which is defined as the sequence of words before the first comma or the first n words if there is no comma. According to some embodiments, n=7. The model structure is illustrated in item 708 with a word embedding layer, a convolutional block followed by a dropout layer, and two fully connected layers with 64 units and 2 units respectively.

Having performed Steps 504-510, Process 500 turns to Step 512 where the full model 700 (e.g., the classifier module 304) is compiled based on the analysis of each preceding step. That is, the full model 700 combines the content, sender, action and salutation sub-models. The full model is illustrated in FIG. 7A, and uses the content model 706 as a base model, and combines 1) final predicted probability scores with rectification from both sender model 702 and action model 704, and 2) a lower-level representation layer from salutation model 708.

According to some embodiments, the following are concatenated to build the final model 700 (or classifier):

Content model 706: representations with 128 hidden units (from Step 504), which are trainable for the full model 700;

Sender model 702: positive and negative signals denoted by $p^+_{sender}$ and $p^-_{sender}$ (from Step 506), where $p_{sender}$ is estimated probability for positive label from sender model's final output;

Action model 704: negative signals denoted by $p^-_{action}$ (from Step 508), where action is estimated probability for positive label from action model's final output; and Salutation model 708: representations with 64 hidden units (before the final layer with 2 hidden units) (from Step 510), which are not trainable for the full model.

In this full model 700, all parameters (weights) from the base model (content model 706) are trainable, while all outputs from the other three models (sender model 702, action model 704, and salutation model 708) are fixed by freezing graphs in these three models. For convenience, the layers of content model 706 are expanded in FIG. 7 to emphasize this feature.

Continuing with Process 500, having compiled the full model 700 based on the analysis of Steps 504-510 (in Step 512), Process 500 continues to Step 514, where the full model 700 is applied to the set of messages and a determination is made as to whether the message is human generated or machine generated ("H/M classification").

Thus, Step 514 determines whether a message is sent and/or generated by a human or machine. In some embodiments, a message can be tagged according to its H/M classification. In some embodiments, this can involve modifying the message to include a displayable indication of its H/M classification. Such modification can be appended to the message, or can involve modifying the header of the message (to indicate to the receiving inbox structure how the organize the message). In some embodiments, the message can be modified prior to its delivery (where engine 300 executes on the server), and in some embodiments, the message can be modified after it is received but prior to its display (where engine 300 executed on a client device). In embodiments where the classification of Process 500 is occurring on previously received messages, the modification can result in the previous display of the message altering its presence within a portion of the inbox.

Turning back to Step 404, as discussed above, another classification process, Process 800, can be performed, which determines a type of category/class of email. As discussed above, this can be performed in combination with (e.g., in addition to) the classification performed in Process 500.

Process 800, therefore, details embodiments for determining a MAGMA class of a message at the message-level. This reduces generalization errors caused by analyses performed at the sender-level by mixed human-machines. The steps of Process 800 are performed by MAGMA module 306 of engine 300. Process 800 details the steps for performing a multi-label categorization of a message based on a set of classes. For purposes of this disclosure, the set of classes are defined by 7 MAGMA classes; however, it should not be construed as limiting, as any number of predefined, user-defined or dynamically defined classes can be used without departing from the scope of the instant disclosure.

The 7 MAGMA classes include: i) Human (personal); ii) Social; iii) Travel; iv) Career; v) Shopping; vi) Finance; and vii) Other.

Travel: This class is used for messages related to travel (e.g., air, train, and the like) cruises, car rentals, lodging, luggage, packing tips, vacation packages, trip bookings and itineraries, and the like. Some examples include newsletters about travel destinations, travel tips; transportation including train, taxi and rideshare communications.

Career: Messages focused on job seeking, recruiting, interviewing, resume and cover letter related, and career development belong to the Career class. This includes messages related products and services. Career class examples include, for example, communication messages with recruiters from employment agencies or via LinkedIn®, online courses and training aimed at making a person more employable.

Finance: This class is for messages directly related to finance, including products, services, news and events. Some examples include, but are not limited to, quarterly earnings, stock price news, bank notifications, and payment transaction confirmations.

Shopping: This class is focused for buying or selling products, services, or experiences. It includes both consumer and business-to-business products and services. Some examples are deals, coupons, promotions about special sales, purchase receipts, shipment and delivery notifications.

Social: This class is for social updates and social networking messages. The online spaces include, for example, Facebook®, Twitter®, Instagram®, SnapChat®, LinkedIn®, TikTok™ and the like. It also includes internet forums where people form specialized groups, such as, for example, Yahoo Groups®. Examples include an alert about a message sent from someone on a social platform, friend requests and social recommendations.

Person: This class is for direct personal correspondence messages. This includes person-to-person and person-to-group messages and covers any kind of message topic between family, friends, correspondence in professional sphere, and the like. For example, typical email messages between family members on Yahoo! Mail®.

Other: This class is for messages that clearly belong to some category but none of the above classes. For example, the Other class is selected for messages about Music, TV, Entertainment, Health, News, Recipes, and the like, that do not belong to the other 6 MAGMA classes.

Therefore, as discussed herein in relation to FIG. 8, Process 800's classification formulates the task as a multi-label problem and uses message subject and content, and incorporates a deep model into the classification pipeline. Process 800 begins with Step 802 where information related to the subject and content of the identified set of messages (from Step 402) are identified. This information is derived, determined or otherwise identified from Step 404, as discussed above.

In Step 804, the subject and content information is then analyzed and a sequence of words is identified. In some embodiments, Step 804 involves applying a text mining or extraction algorithm, e.g., Natural Language Processing (NLP) algorithm, to identify words present in the subject line and message body of the messages. In some embodiments, Step 804 involves identifying the subject and content words from the subject and content data, as the words were mined from the analysis performed in Step 404, as discussed above.

According to some embodiments, the maximum sequence length for a subject is 30, and the maximum sequence length for content is 1000. Thus, in such embodiments, Step 804 involves identifying a maximum of 30 words for the subject of a message and 1000 words for the content of a message.

In Step 806, the sequence of words are embedded into vectors through an embedding matrix using a text2vec algorithm, e.g., GloVe. That is, the subject sequence and the content sequence are translated into vectors, therefore resulting in a subject vector and a content vector for each message in the set of messages.

According to some embodiments, for example, given a subject or content sequence of words $w_{it}$, $t \in [0,T]$, attributes to T words the sequence, the words are first embedded to vectors using GloVe, where the GloVe dictionary has 400,000 words in its dictionary. Thus, given a sentence I, which has T tokens, it is represented in a sequence of embeddings:

$$Ei = (w_{ei1}, w_{ei2}, \ldots w_{eiT}),$$

$w_{eit}$ represents the d dimensional embedding for the $i^{th}$ words in the sentence. S is the sequence represented as a 2D matrix, which concatenates all the word embeddings together. That is, S is the shape of T×d.

In Step 808, a text classifier is applied to the created subject and content vectors from Step 806. The text classifiers can be defined by any known or to be known machine-learning classifier or deep learning architecture, algorithm, technique or mechanism, including, but not limited to, linear classifiers (e.g., logistic regression, naive Bayes classifier), CNN or CRNN (convolutional recurrent neural network).

For example, with regard to using a CNN classifier in Step 808, the CNN classifier has at least a convolutional and maxpool layer (as discussed above in relation to FIG. 6). The subject and content vectors are passed through the convolution and maxpool layers independently, resulting in feature vectors being concatenated.

In another example, a CRNN is implemented, where the convolutional layer is followed by an activation function, max-pooling layer then a BI-LS™ model. Application of this CRNN classifier model enables the determination of the correlation between a sequence of words, while learning word representations simultaneously. The max-pooling layer is used after the convolution layer to capture key components in the emails, such as word usage, type, frequency and other contributors in determining how messages comport with one of the MAGMA categories.

In Step 810, the set of messages are properly categorized according to at least one of the 7 MAGMA classes. Such classification is resultant, for example, the CRNN classifier application occurring in Step 808. As discussed above, a message can have more than one classification; therefore, Step 810 results in the message being tagged according to a class its information (e.g., content, sender information, and the like) corresponds to. This is depicted in FIG. 9, and discussed below.

In some embodiments, the message(s) can be modified to include the classification designation(s), which can be displayed as an indicator (e.g., a flag/tag). Such modification can be appended to the message, or can involve modifying the header of the message (to indicate to the receiving inbox structure how the organize the message). In some embodiments, the message can be modified prior to its delivery (where engine 300 executes on the server), and in some embodiments, the message can be modified after it is received but prior to its display (where engine 300 executed on a client device). In embodiments where the classification of Process 800 is occurring on previously received messages, the modification can result in the previous display of the message altering its presence within a portion of the inbox, and/or how its indicators are displayed.

Figure 9:
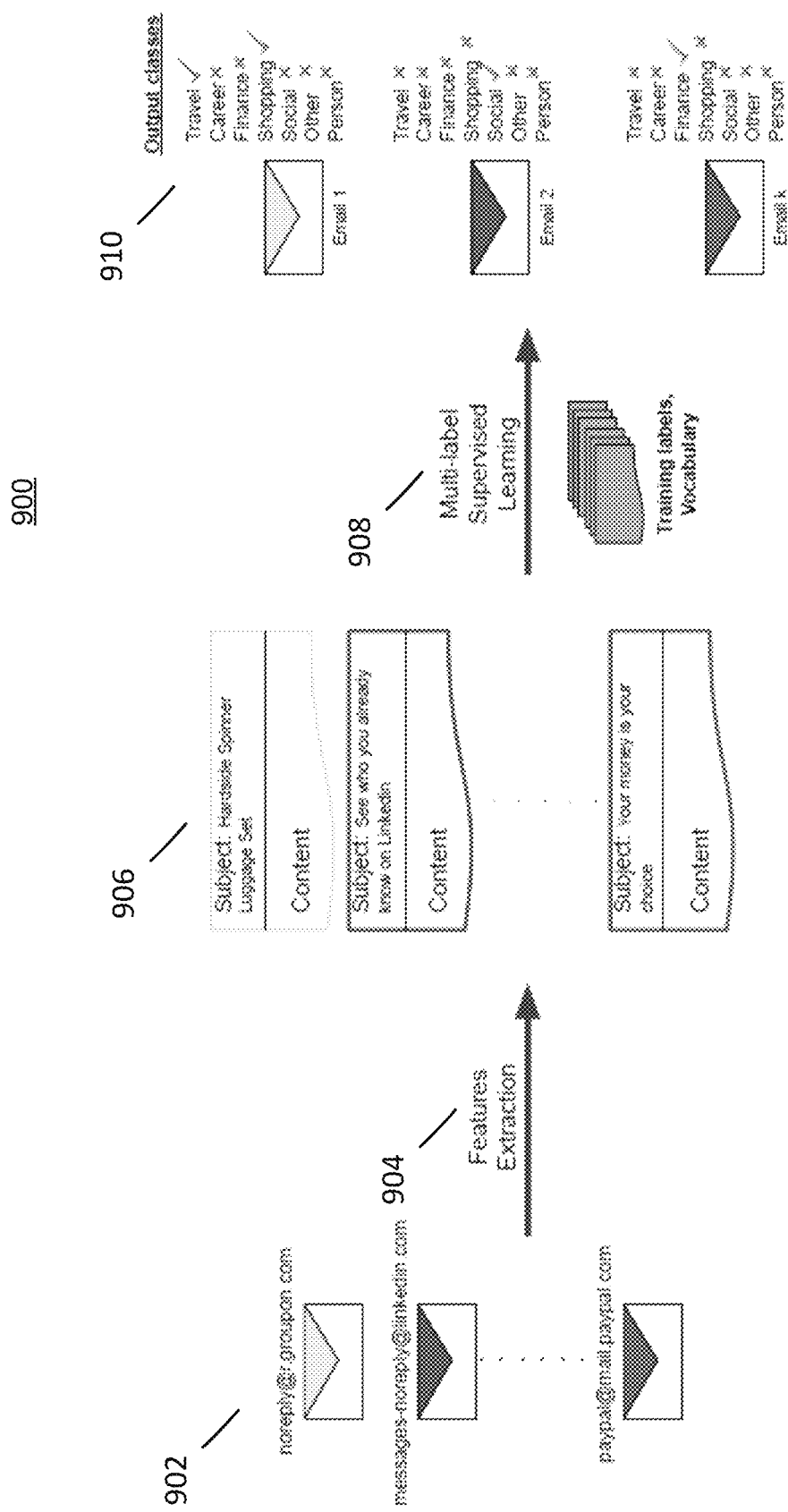
FIG. 9 is a schematic diagram illustrating a non-limiting example of components for classifying a message in accordance with some embodiments of the present disclosure.

For example, turning to FIG. 9, a pipeline 900 is depicted which illustrates an example embodiment of how 3 messages are analyzed under Process 800. The set of messages 902 are analyzed, and have their features extracted 904 (via Steps 402-404 and 802); then the subject and content information 906 is identified (Steps 404 and 804). The multi-label supervised learning 908 is performed (e.g., the vector creation and CNN/CRNN application discussed above in Steps 806-808), where a message is properly labeled under at least one of the MAGMA categories 910 (Step 810).

For example, a person receives an email that includes their travel purchase information and itinerary for a flight they just booked online. This would fall under the Travel and Shopping classes. As a result, the message for "Email 1" in FIG. 9 under item 910 is categorized as a Travel and Shopping message.

Turning back to FIG. 4, having classified the message under Step 404 via Processes 500 and/or 800, where the H/M classification and/or MAGMA classes are determined and applied, respectively, Process 400 proceeds to Step 406, where a message is delivered and displayed in an inbox. The manner a message is delivered and displayed within the inbox can be dictated, in whole or at least in part, based on whether it was a human or machine that generated a message, or the message's MAGMA categorization (as discussed above in relation to Steps 514 and 810, respectively). This can, for example, dictate where within the inbox structure the messages are stored, and/or how they are displayed, whether the message is tagged, placed in a folder, or automatically triaged in any other manner, whether defined by settings of the user, mail platform or based on other known or to be known triaging mechanisms that account for message type and categorization For example, messages can have a tag or indicator displayed as part of the message's display that indicates which H/M classification and/or MAGMA class the message falls within. Messages can also be automatically filtered to specific folders or have specific actions performed based on their H/M classification and/or MAGMA class.

For example, a message is a machine generated message that relates to Shopping. The recipient can have preset rules that cause such messages to be automatically sent to a specific folder for later viewing. In another example, they may be sent directly to a Trash or Spam folder.

In another example, a message is classified as human generated with the Finance and Person classes. These can result in the message being tagged as important, as they may involve a stock tip from the user's broker or friend.

Thus, according to some embodiments, the display and organization of the identified set of messages in Step 406 directly corresponds to and depends on the H/M classification (from Process 500) and/or MAGMA class designation (from Process 800).

FIG. 10 is a work flow process 1000 for serving related digital media content based on the information associated with a classified message, as discussed above in relation to FIGS. 3-9. In some embodiments, the content can be associated with or comprising advertisements (e.g., digital advertisement content). Such content can include or be based upon, but is not limited to, information indicating the H/M classification, information indicating which MAGMA class it is in, information associated with an object a user received in his/her mailbox (e.g., a message or digital content included in a classified message, for example), a context of a user's activity on a network that caused the delivery, and the like (e.g., how did the user interact with a message or message information, and/or some combination thereof). Such information can be referred to as "message information" for reference purposes only.

Process 1000 discusses embodiments for engine 300 to provide functionality for mail systems to partner with third party entities enabling the entities to provide digital content for display within an inbox of a user based on the message information determined, discovered, derived or otherwise identified from Processes 400, 500 and 800, as discussed above.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 1002, message information is identified. As discussed above, the message information can be based any of the information utilized, determined and/or generated from/ during the mail classification mechanisms outlined above with respect to FIGS. 3-9. For purposes of this disclosure, Process 500 will refer to single classified message; however, it should not be construed as limiting, as any number of messages used can form such basis, without departing from the scope of the instant disclosure.

In Step 1004, a context is determined based on the identified message information. This context forms a basis for serving content related to the message information. For example, a message was classified as being sent from a human sender and was identified as part of the "Personal" and "Travel" classes. Therefore, the context identified in Step 1004 can be directly derived therefrom as a "personal" and "travel"; and, can be leveraged in order to identify digital content related to additional deals for the user at airports, hotels or for future trips.

In some embodiments, the identification of the context from Step 1004 can occur before, during and/or after the analysis detailed above with respect to Processes 400, 500 and 800, or it can be a separate process altogether, or some combination thereof.

In Step 1006, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the engine 300) a search for a relevant digital content within the associated database. The search for the content is based at least on the identified context.

In Step 1008, the server searches the database for a digital content item(s) that matches the identified context. In Step 1010, a content item is selected (or retrieved) based on the results of Step 1008. In some embodiments, the selected content item can be modified to conform to attributes or capabilities of the message, or page, interface, platform, application or method upon which the classified message and/or content item will be displayed, and/or to the application and/or device for which it will be displayed. In some embodiments, the selected content item is shared or communicated via the application the user is utilizing to view, render and/or interact with a message, text, media, content or object item. Step 1012. In some embodiments, the selected content item is sent directly to a user computing device for display on the device and/or within the UI displayed on the device's display (e.g., inbox, or as a message within the inbox). In some embodiments, the selected content item is displayed within a portion of the interface or within an overlaying or pop-up interface associated with a rendering interface displayed on the device. In some embodiments, the selected content item can be displayed as part of a coupon/ad clipping, coupon/ad recommendation and/or coupon/ad summarization interface.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising the steps of:

receiving, at a computing device on a network, a message, said message addressed to an inbox of a recipient and sent by a sender, said message comprising message content;

parsing, via the computing device, said message, and identifying message information related to the sender, the message content and a subject of the message;

applying, via the computing device, a H/M classifier to said message, said H/M classifier comprising a combination of sub-models that analyze a message based on specific features of a message, said application of the H/M classifier comprising analyzing the sender information and the content information via said combination of sub-models based on said specific features;

determining, via the computing device, based on said H/M classifier application, information indicating whether said message sender is a machine or human;

applying, via the computing device, a MAGMA classifier to said message, said MAGMA classifier comprising a word encoder for specific portions of a message, said application of the MAGMA classifier comprising analyzing the subject information and the content information via said portion specific word encoder, wherein the application of the word encoder of the MAGMA classifier comprises:

analyzing the subject information, and based on said analysis, identifying a set of words less than a predetermined threshold within said subject;

analyzing the content information, and based on said analysis, identifying a set of words less than a predetermined threshold within said content;

creating a subject vector and a content vector based on the subject and content analysis, respectively;

concatenating the subject vector and the content vector based on application of a text classifier to the subject vector and the content vector;

analyzing the concatenated vector via a text classifier, the text classifier comprising a convolutional neural network layer; and determining the at least one specific category for the message based on said analysis;

determining, via the computing device, based on said MAGMA classifier application, information indicating at least one specific category said message is associated with;

applying, via the computing device, a set of indicators to said message, said set of indicators providing information related to said machine or human determination and said MAGMA categorization; and communicating, via the computing device, over said network, said message to said inbox along with said set of indicators.

2. The method of claim 1, wherein said sub-models of said H/M classifier comprise a content model, sender model, action model and salutation model.

3. The method of claim 2, wherein application of said content model comprises:
creating a vector representation of each word in said sender information;
creating a vector representation of each word in said content information;
analyzing, via a CNN layer of the content model, each vector, and based on said analysis, concatenate each vector to a content model vector; and
analyzing said content model vector via a softmax function, and based on said analysis, determining whether said message sender was a machine or a human.

4. The method of claim 2, wherein application of the sender model comprises:
identifying, from said sender information, an email address and a name of said sender;
generating a vector representation of said email address;
generating a vector representation of said name;
concatenating each vector based on convolutional analysis of each vector to generate a sender model vector; and
analyzing said sender model vector, and based on said analysis, determining whether said message sender was a machine or a human.

5. The method of claim 2, wherein application of the action model comprises:
identifying data indicating actions related to message deletions within said inbox;
identifying data related to actions of opened messages within said inbox;
training a CNN model based on said identified deletion and opened data;
applying said trained CNN model to said sender information and content information; and
determining whether said message sender was a machine or a human.

6. The method of claim 2, wherein application of the salutation model comprises:
identifying data indicating a positive label, said positive label corresponding to messages that contain an explicit salutation, said explicit salutation being a message with a match between the n beginning part of a message body and a recipient name;
identifying data indicating a negative label, said negative label corresponding to messages that do not contain said explicit salutation;
training a CNN model based on said identified positive label and negative label data;
applying said trained CNN model to at least a portion of said message content; and
determining whether said message sender was a machine or a human.

7. The method of claim 1, wherein said at least one specific category is selected from a group of MAGMA classes comprising: Human (personal), Social, Travel, Career, Shopping, Finance and Other.

8. The method of claim 1, wherein said communication causes said message to be displayed in a portion of a user interface of the inbox based on at least one of said set of indicators.

9. The method of claim 1, further comprising:
searching, over a network, a datastore associated with third party entities based on information associated with said message;
identifying, based on said search, third party digital content from said datastore, said third party digital content; and
communicating, over the network, along with said communicated message for display within said inbox, said identified third party digital content.

10. A non-transitory computer-readable storage medium tangibly encoded with computer-executable instructions, that when executed by a processor associated with a computing device, performs a method comprising the steps of:
receiving, at the computing device on a network, a message, said message addressed to an inbox of a recipient and sent by a sender, said message comprising message content;
parsing, via the computing device, said message, and identifying message information related to the sender, the message content and a subject of the message;
applying, via the computing device, a H/M classifier to said message, said H/M classifier comprising a combination of sub-models that analyze a message based on specific features of a message, said application of the H/M classifier comprising analyzing the sender information and the content information via said combination of sub-models based on said specific features;
determining, via the computing device, based on said H/M classifier application, information indicating whether said message sender is a machine or human;
applying, via the computing device, a MAGMA classifier to said message, said MAGMA classifier comprising a word encoder for specific portions of a message, said application of the MAGMA classifier comprising analyzing the subject information and the content information via said portion specific word encoder, wherein the application of the word encoder of the MAGMA classifier comprises:
analyzing the subject information, and based on said analysis, identifying a set of words less than a predetermined threshold within said subject;
analyzing the content information, and based on said analysis, identifying a set of words less than a predetermined threshold within said content;
creating a subject vector and a content vector based on the subject and content analysis, respectively;
concatenating the subject vector and the content vector based on application of a text classifier to the subject vector and the content vector;
analyzing the concatenated vector via a text classifier, the text classifier comprising a convolutional neural network layer; and
determining the at least one specific category for the message based on said analysis;
determining, via the computing device, based on said MAGMA classifier application, information indicating at least one specific category said message is associated with;
applying, via the computing device, a set of indicators to said message, said set of indicators providing information related to said machine or human determination and said MAGMA categorization; and
communicating, via the computing device, over said network, said message to said inbox along with said set of indicators.

11. The non-transitory computer-readable storage medium of claim 10, wherein said sub-models of said H/M classifier comprise a content model, sender model, action model and salutation model.

12. The non-transitory computer-readable storage medium of claim 11, wherein application of said content model comprises:
creating a vector representation of each word in said sender information;
creating a vector representation of each word in said content information;
analyzing, via a CNN layer of the content model, each vector, and based on said analysis, concatenate each vector to a content model vector; and
analyzing said content model vector via a softmax function, and based on said analysis, determining whether said message sender was a machine or a human.

13. The non-transitory computer-readable storage medium of claim 11, wherein application of the sender model comprises:
identifying, from said sender information, an email address and a name of said sender;
generating a vector representation of said email address;
generating a vector representation of said name;
concatenating each vector based on convolutional analysis of each vector to generate a sender model vector; and
analyzing said sender model vector, and based on said analysis, determining whether said message sender was a machine or a human.

14. The non-transitory computer-readable storage medium of claim 11, wherein application of the action model comprises:
identifying data indicating actions related to message deletions within said inbox;
identifying data related to actions of opened messages within said inbox;
training a CNN model based on said identified deletion and opened data;
applying said trained CNN model to said sender information and content information; and
determining whether said message sender was a machine or a human.

15. The non-transitory computer-readable storage medium of claim 11, wherein application of the salutation model comprises:
identifying data indicating a positive label, said positive label corresponding to messages that contain an explicit salutation, said explicit salutation being a message with a match between the n beginning part of a message body and a recipient name;
identifying data indicating a negative label, said negative label corresponding to messages that do not contain said explicit salutation;
training a CNN model based on said identified positive label and negative label data;
applying said trained CNN model to at least a portion of said message content; and
determining whether said message sender was a machine or a human.

16. The non-transitory computer-readable storage medium of claim 10, wherein said at least one specific category is selected from a group of MAGMA classes comprising: Human (personal), Social, Travel, Career, Shopping, Finance and Other.

17. A computing device comprising:
a processor; and
a non-transitory computer-readable storage medium for tangibly storing thereon program logic for execution by the processor, the program logic comprising:
logic executed by the processor for receiving, at the computing device on a network, a message, said message addressed to an inbox of a recipient and sent by a sender, said message comprising message content;
logic executed by the processor for parsing, via the computing device, said message, and identifying message information related to the sender, the message content and a subject of the message;
logic executed by the processor for applying, via the computing device, a H/M classifier to said message, said H/M classifier comprising a combination of sub-models that analyze a message based on specific features of a message, said application of the H/M classifier comprising analyzing the sender information and the content information via said combination of sub-models based on said specific features;
logic executed by the processor for determining, via the computing device, based on said H/M classifier application, information indicating whether said message sender is a machine or human;
logic executed by the processor for applying, via the computing device, a MAGMA classifier to said message, said MAGMA classifier comprising a word encoder for specific portions of a message, said application of the MAGMA classifier comprising analyzing the subject information and the content information via said portion specific word encoder, wherein the application of the word encoder of the MAGMA classifier comprises:
analyzing the subject information, and based on said analysis, identifying a set of words less than a predetermined threshold within said subject;
analyzing the content information, and based on said analysis, identifying a set of words less than a predetermined threshold within said content;
creating a subject vector and a content vector based on the subject and content analysis, respectively;
concatenating the subject vector and the content vector based on application of a text classifier to the subject vector and the content vector;
analyzing the concatenated vector via a text classifier, the text classifier comprising a convolutional neural network layer; and
determining the at least one specific category for the message based on said analysis;
logic executed by the processor for determining, via the computing device, based on said MAGMA classifier application, information indicating at least one specific category said message is associated with;
logic executed by the processor for applying, via the computing device, a set of indicators to said message, said set of indicators providing information related to said machine or human determination and said MAGMA categorization; and
logic executed by the processor for communicating, via the computing device, over said network, said message to said inbox along with said set of indicators.

* * * * *